UNITED STATES PATENT OFFICE.

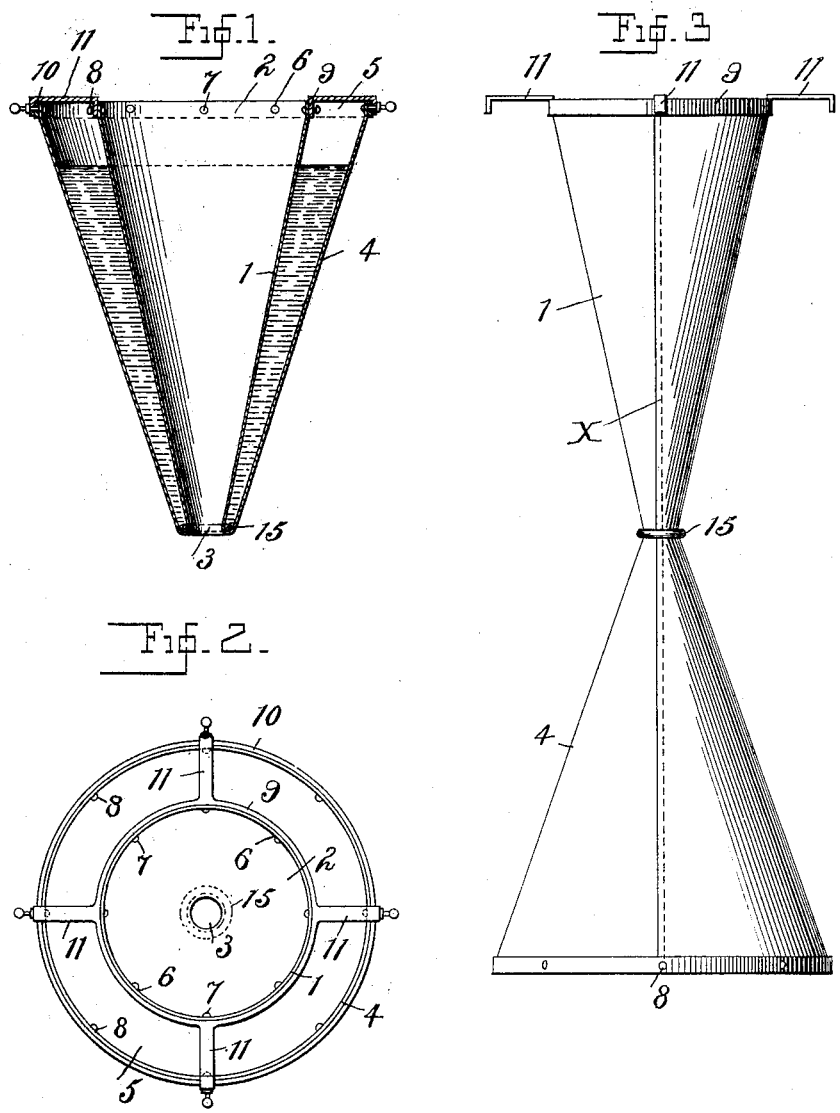

JOKICHI TAKAMINE, OF NEW YORK, N. Y., AND EBENEZER VOSE HITCH, OF CHICAGO, ILLINOIS.

FILTER-BAG OR STRAINER.

SPECIFICATION forming part of Letters Patent No. 659,041, dated October 2, 1900.

Application filed June 30, 1900. Serial No. 22,231. (No model.)

*To all whom it may concern:*

Be it known that we, JOKICHI TAKAMINE, a subject of the Emperor of Japan, residing in the city, county, and State of New York, and EBENEZER VOSE HITCH, a citizen of the United States of America, residing in the city of Chicago, county of Cook, and State of Illinois, have invented certain new and useful Improvements in Filter-Bags or Strainers, of which the following is a specification.

This invention relates to improvements in filtering or straining devices for separating the liquid constituent from insoluble substances; and the object of our invention is to produce a filter in the form of a bag which will afford about double the filtering-surface of the ordinary filtering-bags which are now in use.

To this end our invention consists in forming a filter or strainer bag of inner and outer strainer walls or sections, which are separated at the top and connected at the bottom to afford a containing-chamber between the inner and outer walls or sections of approximately-annular cross-section. The inner wall or section has an opening at the bottom for the free passage of the liquid constituent of the material which strains or filters through the said inner wall or section. The double-walled filtering or straining bag affords inner and outer filtering or straining surfaces of about double the area of ordinary filtering or straining bags.

In order that our invention may be fully understood, we will first describe the same with reference to the accompanying drawings and afterward point out the novelty more particularly in the annexed claims.

In said drawings, Figure 1 is a vertical sectional view of our improved filter or strainer bag. Fig. 2 is a top plan view of the same. Fig. 3 is a side elevation of the same, representing the inner and outer sections separated and extended into position to allow the insoluble parts of the material filtered or strained to be removed from the bag.

In carrying our invention into practical use we may form the inner and outer sections of the filtering-bag of cylindrical or conical or other preferred shape. We have represented the filtering-bag in the accompanying drawings of conical shape, which is considered to be the most satisfactory shape for straining or filtering purposes.

1 is the inner conical bag or strainer, which is open at its top 2 and at its bottom 3, and is connected at bottom to the outer filtering or straining bag 4, which is also of conical shape and is open at its top 5 and is separated from the top 2 of the inner bag 1.

In making the improved filtering or straining bag with double walls we may make it of a single piece of material or of several pieces of material properly stitched or otherwise secured together. We have represented in the drawings the filter-bag made of a single piece of material, the shape of which will approximate two truncated isosceles triangles, attached at their small ends, the two truncated triangular sections being of the same length, but of different widths at their bases.

In Fig. 3 the double bag 1 4 is shown as made of a single piece of material, with a line of stitches X extending longitudinally of the two bags. When the blank of material, shaped as described, is sewed up to unite the two long edges, it will form a double hollow cone joined by a central contracted neck having an opening through it. The large cone-shaped section is then drawn over the smaller one to form the filter-bag, as shown in Fig. 1 of the drawings.

The upper or open ends of the bag 1 4 are formed with eyelets 6, which are adapted to be buttoned onto pins or lugs 7 8 of the inner and outer frames or spiders 9 10 to properly support the double bag at the top, with an annular opening for the insertion of the material to be strained. The bags may, however, be provided with any other suitable means for attaching them to a supporting-frame. The inner frame or spider 9 may be formed with radial arms 11, which project outwardly and engage the outer frame or ring 10 to support the inner bag in proper relation to the outer bag. The whole filter or strainer may be properly supported upon a suitable base (not shown) when the device is to be used.

15 is a ring surrounding the contracted central portion connecting the inner and outer bags. This is merely for the purpose of giving shape to the lower end of the double bag and to assist in holding the inner and outer walls of the bag apart at the small lower end.

As shown in Fig. 1 of the drawings, the material to be filtered or strained is poured into the space between the inner and outer bags. The liquid constituent of the material will filter through the inner and outer walls and go down to the small end of the double bag, the liquid strained through the inner wall 1 passing through the outlet 3, where it will drip into any suitable receptacle provided to receive it. When the straining or filtering operation is completed, the bag is removed from its supporting-frame, and the outer or larger bag is reversed and pulled down from around the smaller bag into the position shown in Fig. 3, when the insoluble parts of the material which have been strained from the liquid can be readily scraped from the surfaces of the bag. Our improved filter or straining-bag may be employed for separating liquid from any material, and it will be found to have double the straining-surface and efficiency of bags for this purpose and this will practically double the speed of filtering or straining materials for a given quantity of material to be filtered.

The filtering or straining bag may be made of any suitable material to accomplish the desired purpose. The material of the strainer will differ, according to the material to be filtered. We have usually made the filter or strainer bag of some flexible material, such as fine cloth.

We do not limit ourselves to any particular shape of straining-bag. As stated above, it may be of any preferred shape, the essential feature of the invention being to provide a filtering or straining bag with inner and outer straining walls or surfaces and a chamber between the inner and outer walls to contain the material to be filtered or strained.

Having thus described our invention, the following is what we claim as new therein and desire to secure by Letters Patent:

1. A filter or strainer having inner and outer filtering or straining walls arranged to form a chamber or pocket between them which is adapted to contain the material to be filtered or strained, substantially as and for the purpose set forth.

2. A filter or strainer comprising two filtering or straining walls suitably connected at bottom, separated at top and arranged to form a chamber or pocket between them which is adapted to contain the material to be filtered, substantially as and for the purpose set forth.

3. A filter or strainer having inner and outer filtering or straining walls arranged to form a chamber of approximately-annular cross-section which is adapted to contain the material to be filtered or strained, substantially as and for the purpose set forth.

4. A filter or strainer consisting of an inner strainer-wall of flexible material, and an outer strainer-wall of flexible material connected at bottom with the bottom of the inner wall and forming therewith a chamber which is adapted to contain the material to be filtered or strained, substantially as and for the purpose set forth.

5. A filter or strainer consisting of an inner strainer-wall having a liquid-outlet at bottom, and an outer strainer-wall connected at bottom with the inner wall and forming therewith a chamber which is adapted to contain the material to be strained, substantially as and for the purpose set forth.

6. A filter or strainer consisting of an inner strainer-wall of approximately-circular cross-section, and an outer strainer-wall of larger approximately-circular cross-section arranged approximately concentrically with the inner strainer-wall and attached to the inner strainer-wall at bottom and separated therefrom at top to form a chamber of approximately-annular cross-section which is adapted to contain the material to be strained, said filter or strainer having an opening at bottom for the passage of the liquid which filters through its inner wall, substantially as set forth.

7. A filter or strainer comprising inner and outer conical sections or bags connected at their small ends and separated at their large ends to afford a material containing and straining chamber between them, substantially as set forth.

8. In a filter or strainer, the combination of the inner and outer filtering or straining walls attached at the bottom and separated at the top, with a suitable frame engaging the said inner and outer walls at top for supporting them with a material containing and straining chamber between them, substantially as set forth.

9. A filter or strainer comprising inner and outer conical walls or bags 1, 4, connected at their small ends, and separated at their large ends, and a ring 15 supported between the said bags at their small ends, substantially as set forth.

JOKICHI TAKAMINE.
EBENEZER VOSE HITCH.

Witnesses to Jokichi Takamine:
  WM. E. KNIGHT,
  J. GREEN.

Witnesses to Ebenezer V. Hitch:
  LEIGH H. JACKSON,
  ABRAM JACKSON.